United States Patent [19]

Sorensen

[11] 3,945,276
[45] Mar. 23, 1976

[54] METHOD FOR REMOVING WASTE DISPOSERS

[76] Inventor: Ejnar Sorensen, P.O. Box 1362, Santa Monica, Calif. 90406

[22] Filed: Feb. 7, 1975

[21] Appl. No.: 547,857

Related U.S. Application Data

[62] Division of Ser. No. 400,312, Sept. 24, 1973, abandoned.

[52] U.S. Cl. .................................... 82/47; 30/106
[51] Int. Cl.² ........................................ B23B 1/00
[58] Field of Search ................. 82/47; 30/106, 107

[56] References Cited
UNITED STATES PATENTS

| 365,564 | 6/1887 | Barnes | 30/106 |
| 2,508,539 | 5/1950 | Reck | 30/107 |

Primary Examiner—Travis S. McGehee
Assistant Examiner—W. R. Briggs
Attorney, Agent, or Firm—Herbert E. Kidder

[57] ABSTRACT

The present invention relates to the removal of an under-the-sink waste disposer; and more particularly relates to a tool for facilitating the removal of such a waste disposer that must be removed for replacement or for repair. The disclosed tool obviates the need for a plumber to crawl into a small cabinet, and to struggle with corroded and rusted fasteners. Instead, the disclosed tool permits the plumber to work from above the sink, where there is plenty of room.

A portion of the disclosed tool is dropped into the sink drain; and cuts away the element that supports the waste disposer. In this way, the plumber may work with ease; and may remove the waste disposer from the under-the-sink cabinet when the disposer has been completely freed from the sink.

1 Claim, 4 Drawing Figures

U.S. Patent March 23, 1976 Sheet 1 of 2 3,945,276
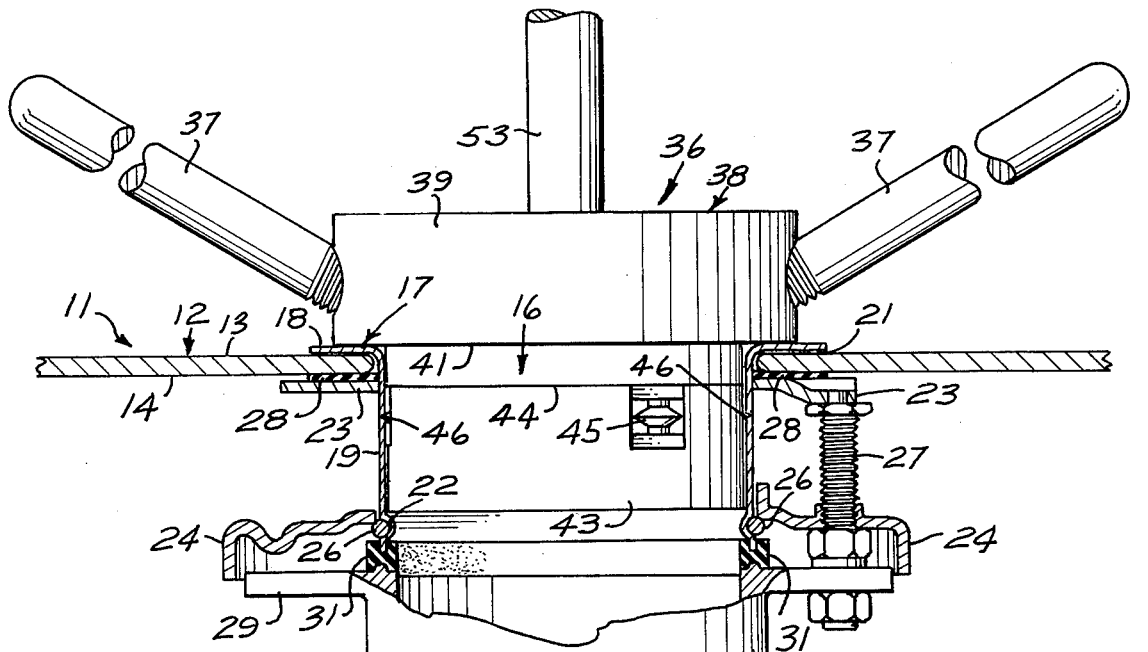
FIG. 1.
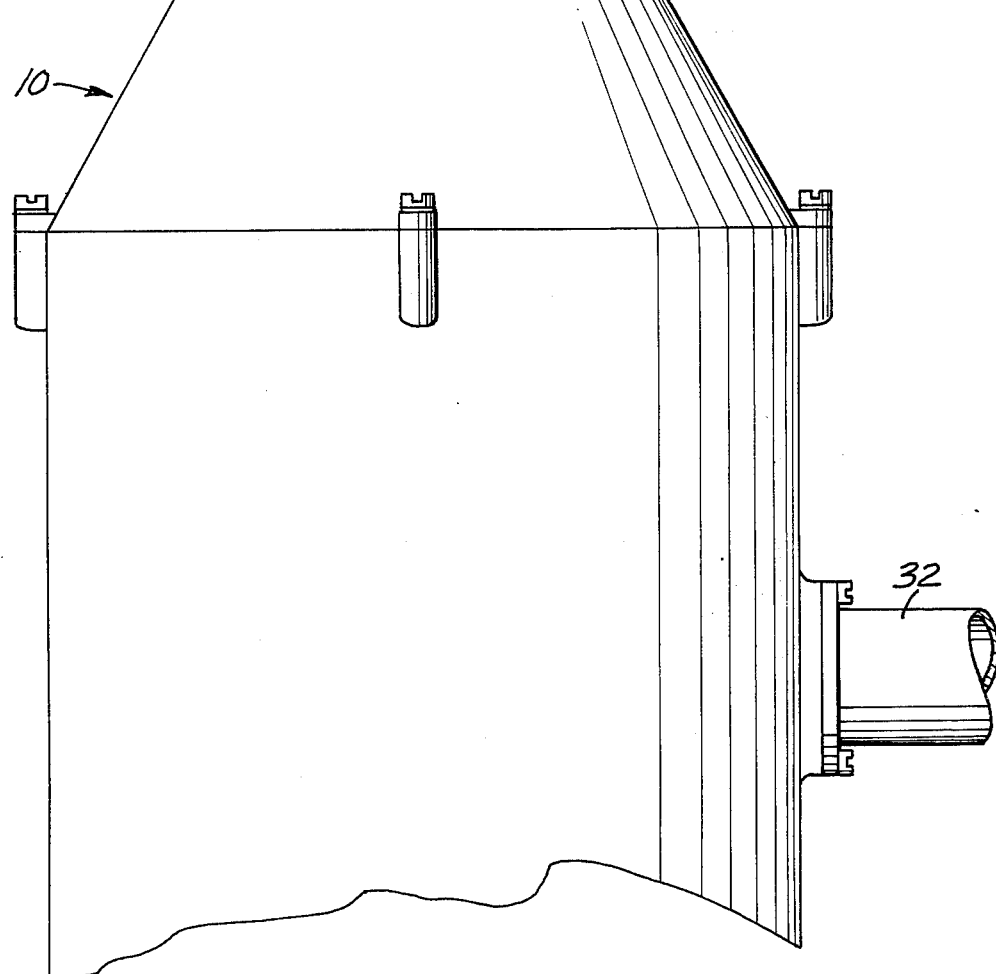

METHOD FOR REMOVING WASTE DISPOSERS

This is a division of application Ser. No. 400,312, filed Sept. 24, 1973, now abandoned.

BACKGROUND OF THE INVENTION

It is well known that kitchen-type wastes are a nuisance to dispose; comprising mixtures of bones, pits, cobs, husks, rinds, stalks, fats, meat trimmings, and other miscellaneous items. For many years, the accepted disposal method was to accummulate these wastes; and to carry them, often dripping, to an outdoor garbage can.

A much improved present-day method of disposing kitchen wastes is to use a electromechanical waste disposer that mounts onto the sink, and fits into an under-the-sink cabinet. The disposer grinds up all of the wastes; and a stream of water from the sink faucet is then used to flush the resultant particles into the drainage system of the building. As may be expected, these waste disposers have a long but limited life; since they involve a motor, grinding teeth, anti-leak seals, plumbing pipes, electric wires, etc; and are exposed to acids, detergents, drain solvents, and to a more-or-less constant vibration. As a result, it is often necessary to bodily remove the waste disposer—either for repair or replacement.

By the time that a waste disposer is ready for removal, the mounting devices thereof are generally badly corroded, rusted, or otherwise permanently bonded to each other. Therefore, it is a plumber's nightmare to have to work in a small under-the-sink cabinet, midst pipes and electrical wiring; and to try to use the various tools at his command for removing the inoperable waste disposer.

It is therefore apparent that there is a need for an improved tool for removing waste disposers from under-the-sink cabinets.

OBJECTIVES AND DRAWINGS:

It is therefore the principal objective of the present invention to provide an improved tool for removing waste disposers.

It is another objective of the present invention to provide an improved waste-disposer removal-tool that is easy to use.

It is still another objective of the present invention to provide an improved waste-disposer removal-tool that is used from above the sink.

It is a further objective of the present invention to provide an improved waste-disposer removal-tool that may be used on all types of disposer mountings.

It is a still further objective of the present invention to provide an improved waste-disposer removal-tool that is simple, and is simple to use.

The attainment of the above objectives and others will be realized from a study of the following description, taken in conjunction with the drawings of which FIG. 1 shows a partially cross-sectional view of a waste-disposer mounted in a sink;

SYNOPSIS

Figure 2:
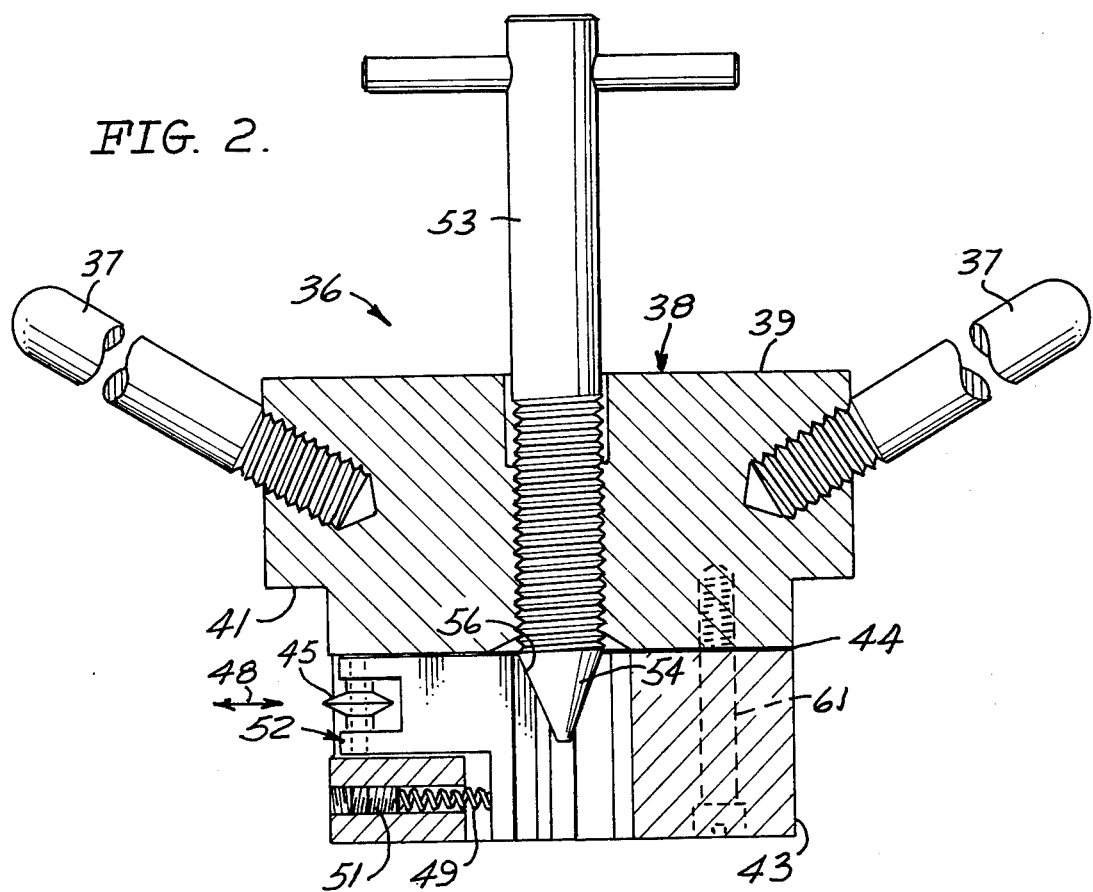
FIG. 2 shows a cross-sectional view of the subject waste disposer removal tool.

Broadly speaking, the disclosed tool for the removal of an under-the-sink waste disposer comprises a body portion that is dropped into the sink drain; this body portion containing a plurality of cutters that are extended to engage the inner surface of the throat portion of the sink flange. Suitable pressure is produced between the cutters and the engaged throat portion of the sink flange; and rotation of the tool causes the cutters to cut through the throat of the flange. The waste disposer then settles onto the piping; and may be easily removed by cutting or uncoupling the piping and the electrical wiring.

INTRODUCTION

Referring now to FIG. 1, there is shown a waste disposer 10 mounted under a sink 11; the bottom portion 12 of the sink 11 having an upper surface 13, a lower surface 14, and a drain opening 16 that is usually about 3½ inches in diameter. A sink flange 17, that resembles a hollow rivet, has an annular supporting rim 18 and a cylindrical throat portion 19; the flange 17 fitting into sink drain opening 16, with its annular supporting rim 18 resting on the upper surface 13 of the sink bottom 12, and with its throat portion 19 fitting within the sink drain hole 16—the throat portion 19 extending downward beyond the sink bottom 12. Usually, a putty, a mastic, a caulking compound, or the like 21, is spread between the underside of the supporting rim 18 and the sink bottom upper surface 13—in order to provide a leak-proof arrangement.

While the installations of waste disposers vary, depending upon the model and the manufacturer, FIG. 1 shows a typical installation of a waste disposer 10 into a sink 11. In general, the sink flange 17, in practically all waste disposer installations, is designed to support the weight of the waste dispenser—at least until the plumping is completed; at which time the pipes support some of the weight of the waste dispenser.

It will be noted that the throat portion 19 of the sink flange 17 is illustrated as having a recessed annular groove 22; a spacer ring 23 and a support ring 24 having been slid over the throat portion 19 before a compressible/expansible snap ring 26 is sprung into the recessed groove 22. Now, by turning a plurality (usually three) of threaded studs 27, their upper ends force the upper spacer ring 23 upwards against a gasket 28 that bears against the lower surface 14 of the sink bottom 12. The support ring 24 is simultaneously forced downward against the snap ring 26. This arrangement affixes the sink flange 17 to the bottom of the sink 11; and simultaneously affixes the support ring 24 against the snap ring 26—the support ring 24 now seating the snap ring 26, and forcing it further into the recessed groove 22.

Once the support ring 24 has been firmly affixed by pressure of studs 27, the waste disposer 10 has its mounting flange 29 bolted onto the studs 27; a suitable resilient collar 31 or equivalent device being used to minimize leakage and to isolate the sink from vibration of the waste disposer 10. Suitable piping 32 is then coupled to the waste disposer 10.

While FIG. 1 has illustrated the typical mounting for a waste disposer, it will be realized that other mountings are used; however, practically all of the various mountings are designed for easy mounting, while everything is new and clean; and none of the mountings seem to have given any thought to the need and process of removing the waste disposer.

The basic concept of the present invention is as follows. Rather than trying to remove the waste disposer by working beneath the sink, with all the attendant disadvantages thereof, the present invention discloses a tool that permits the waste disposer to be removed by a person working above the sink, where there is plenty of room.

A tool for achieving this result is also shown in FIG. 1. Here the tool 36 comprises a pair of angled opposed handles 17 attached to a, preferably cylindrical, tool body 38 whose upper portion 39 is larger in diameter than the sink drain opening 16, so that the annular bearing surface 41 of the upper body portion 39 of the tool rests upon the upper surface of the supporting rim 18 of the sink flange 17. The tool 36 also comprises a lower—also preferably cylindrical—body portion 43 of a smaller diameter, that fits into the throat portion 19 of the sink flange 17. The upper tool body 39 and the lower tool body 43 interface at a body line 44. The structure and function of the lower tool body 43 will be discussed later in greater detail.

Thus, the handles 37 may be used to rotate the tool 36; the weight of the tool being carried by the supporting rim 18 of sink flange 17. The angled handles and the sink itself provides sufficient room for operating the tool.

It is now desirable to digress for a moment, in order to further discuss the sink flange 17. It is of course desirable to make the sink flange of a material that is rust-proof, corrosion-proof, and strong enough to support the weight of the waste disposer.

Early waste disposers were relatively light-weight; so the sink flange 17 was originally made of brass. However, as the weight of the waste disposers increased (they now range up to about 30 lbs.), it became necessary to form the sink flanges 17 of stainless steel having appreciable strength and thickness.

The present invention mounts cutters, one of which is indicated at 45, on the lower tool body 43; and the rotation of the tool handles 37 causes the cutters 45 to press against the inner surface of the throat 19 and to cut an angular groove 46 that eventually penetrates through the throat portion 19 of the same flange 17. When the cutting operation has been completed, the waste disposer 10 is now free of the sink, and sags to be supported by the piping 32 attached to it. It is now relatively easy to cut or uncouple the pipes and the electrical wiring, to remove the waste disposer, and to remove the cut-apart sink flange 17.

In those cases where the sink flange throat 19 is made of brass or of some other relatively soft material, the cutters 45 of the tool may take the form of scrapers; but it is preferrable that the cutters 45 take the form of a plurality of rotatably cutting wheels (preferably three that are equally spaced). The cutters 45 are preferrably mounted in such a way that they are normally retracted into the tool body; but may be forcibly extended for the cutting function.

The structure of the tool itself may be better understood from a study of FIG. 2. Here, the cross-sectional view shows the tool 36, its upper body portion 39, the handles 37, and the bearing surface 41 of the upper body portion. FIG. 2 also shows the tool's body interface line 44, a cutter holder 52 that will be more fully discussed later, and a cutting wheel 45. The double-ended arrow 48 indicates that the cutter 45 may be moved radially into and out of the lower tool body 43; being normally retracted into the lower body portion 43 as by means of a compression spring 49 whose outer end bears on an internal set-and-lock in screw combination 51 in the lower body portion 43. The inner end of spring 49 bears upon a portion of the radially slidable cutter holder 52 that holds the cutter 45. In this way, the plurality of cutters 45 are normally retracted for protection and convenience during tool storage, and during the insertion of the lower tool body into the sink flange.

As indicated above, the cutter holder 52 is preferably slidably positioned in the lower body 43; so that the holder 52 and its cutter 45 may move inward for normal storage, for protection of the cutters, and for facilitating the insertion of the tool into the sink directly. The cutters, as will be shown later, may be extended for their actual cutting operation.

It will be realized that an appreciably extending force must be applied to the cutter holders 52 in order for the cutters 45 to perform their cutting operation; and such extending forces may be provided as follows.

The tool comprises a threaded extender rod 53 that is threadedly engaged with the upper body portion 39; so that by rotating the rod 53, the end of the rod may be forcefully moved downward. The lower end of rod 53 has a conical configuration 54; and as the conical configuration 54 moves downward, its conical sloping surfaces press against the inner ends of the cutter holder 52—thus equally forcing apart the holders 52, and causing all of the cutters 45 to simultaneously engage the throat 19 of the sink flange 17.

It may be desirable to slope or taper the inner shoulder portions of the cutter holders 52 as indicated at 56, in order to improve the expander action of the cutter by the conical configuration 54 of the extender rod 53.

In this way, the tool is automatically centered in the sink flange; and the various cutters 45 produce substantially equal cutting action to form the cutting groove 46. Thus, while the cutters 45 are normally retracted into the tool body, they may be forcibly extended by the conical tip of the extender shaft 53.

Figure 3:
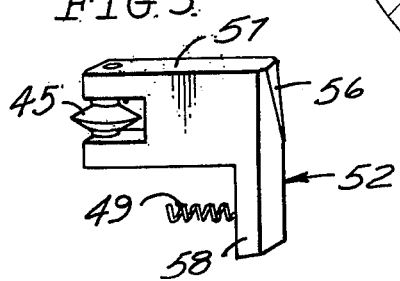
FIG. 3 shows a pictorial view of the cutter arrangement.

Attention is now directed to FIG. 3, which shows a pictorial view of a typical cutter holder 52. As illustrated, cutter holder 52 has an L-type configuration; the horizontal arm 57 thereof having a cutter 45 positioned at the outer extremity thereof, and the vertical leg 58 being adapted to be engaged by the compression spring 49. When the cutter holder 52 is assembled into the subject tool, the holder 45 is adapted to slide radially outward under the influence of the conical tip 54 of the extender rod 53; and to slide radially inward under the influence of the compression spring 49. Thus, the cutter 45 may be extended beyond the periphery of the tool—as indicated in FIG. 2—in order to perform its cutting operation.

Figure 4:
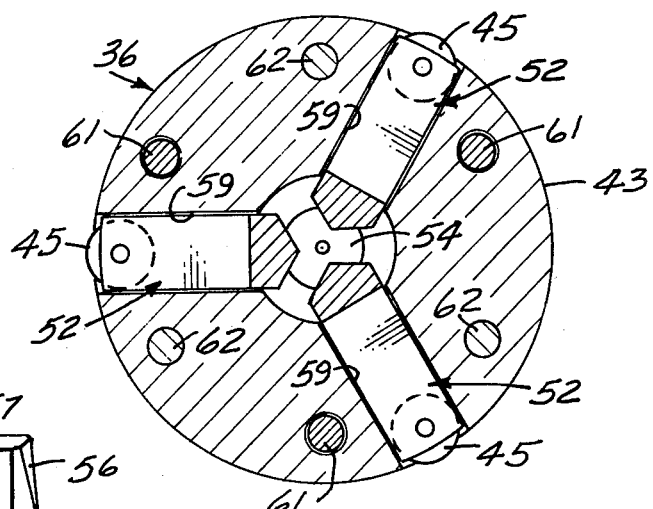
FIG. 4 shows a partial cross-sectional bottom view of the disclosed tool.

Attention is now directed to FIG. 4, which illustrates a partially cross-sectional bottom view of the tool 36. This view shows a plurality, three in the present case, of cutter holders 52 positioned in radial guide slots 59 that permit radial movement of the cutter holders 52. In FIG. 4, the cutters 45 are illustrated in their extended positions; projecting slightly beyond the periphery of the tool's lower body 43 under the action of the conical end 54 of the extender rod 53.

It has been found advantageous to form the tool body 38 of a driving upper body portion 39 and a driven lower body portion 43 (see FIGS. 1 and 2); as in this way the handles 37 may be easily attached to the driving body portion 39, and the cutter holders 52 may be easily fitted to their guide slots 59 in the lower driven tool body portion 43.

In order to assemble the upper and lower tool bodies 39 and 43, a plurality of assembly bolts 61 of FIGS. 2 and 4 may be used; but it has been found desirable to use these bolts as merely assembly devices, rather than as torque transmitters.

Therefore, a plurality of driving pins 62 have been used to provide the torqueing connections between the upper driving body portion 39 and the lower driven body portion 43. In this way, by using driving torque pins of suitable material, strength, dimensions, etc, they may be easily incorporated into the tool without presenting demands for unreasonable space requirements.

When the tool is stored, its extender rod 53 is normally backed off; this action permitting the compression springs 49 to move the cutter holders 52 radially inward, to position the cutters 45 safely within the periphery of the lower driven tool body portion 43.

When the tool is to be used, its lower driven body portion 43 is positioned, from above, within the throat 19 of the sink flange 17; and the tool is then lowered until its bearing surface 41 of the upper driving tool body 39 comes to rest on the surface of the support rim 18. At this time, the cutters 45 are automatically positioned at a suitable level to engage the throat 19.

Now, the extender rod 53 is rotated to move its conical tip 54 downward until the sides of the conical tip contact the sloped shoulder surfaces 56 of the cutter holders 52. The extender rod 53 is then lowered still further; until the cutters 45 are suitably pressed against, and engaged with, the inner surface of throat 19.

At this time, the handles 37 are used to rotate the driving upper body portion 39; and the driving pins 62 drive the lower driven body portion 43 into rotation. In this way, the cutters 45 press against, and cut into, the inner surface of the throat 19 to produce the angular cutting groove 46. The extender rod 53 is now screwed down a bit more, and the rotation of the tool is resumed. This procedure is repeated until the cutting groove 46 penetrates the throat 19.

At this time, the waste disposer is supported by the piping 32; and these pipes, and the electrical wiring (not shown) may now be cut or uncoupled. The upper cut-away portion of the sink flange 17 may now be easily removed. The waste disposer is now ready to be replaced or repaired.

SUMMARY

The disclosed apparatus has a large number of advantages over prior-art means for removing under-the-sink waste disposers. First of all, it facilitates the removal of the waste disposer in a matter of minutes. Second, it permits the easy removal of the cut-away sink flange. Third, it obviates possible damage to the sink, to the plumbing, and to the electrical wiring. Fourth, the disclosed tool works on practically any type of waste-disposer mounting. Fifth, the disclosed tool has a very positive action. Sixth, the disclosed tool requires no maintenance or expertise. Seventh, the disclosed tool obviates the need for having the plumber work in a small under-the-sink cabinet. Eighth, it obviates the need for having the plumber use poorly adapted tools for loosening or cutting rusted or corroded fasteners. Ninth, it obviates the need for the plumber to work by feel in a semi-dark quarters. Tenth, it obviates the need for a plumber to work in an uncomfortable position. Eleventh, it permits the plumber to work from above the sink. Twelfth, it permits the plumber to work in a practically-erect, comfortable position. Thirteenth, it permits the use of an easy rotary movement of a specially designed tool. Fourteenth, it permits the use of conveniently-placed angled handles. Finally, the disclosed tool is economical to manufacture.

I claim:

1. The method of removing a waste disposer from a kitchen sink, in which the disposer is secured to the bottom ends of the threaded studs that are screwed into a support ring surrounding the cylindrical throat of a sink flange and resting on a snap ring seated in a circumferential groove in the outer surface of the flange throat, said threaded studs bearing upwardly at their top ends against a spacer ring abutting against the underside of the sink, said method comprising the steps of:

inserting a cutting tool, from above the sink, down into the throat of the sink flange;

positioning the cutters of the tool at a level between said spacer ring and said support ring;

rotating said tool from the sink, while gradually expanding the cutters outwardly until said sink flange throat has been cut through;

allowing said waste disposer with attached support ring, threaded studs, and the severed bottom end of the sink flange throat to drop away from the bottom of the sink, supported solely by the waste pipe;

removing the severed top end of the sink flange from the drain opening of the sink; and removing the waste disposer from the waste pipe to which it is connected.

* * * * *